(12) United States Patent
Nielsen et al.

(10) Patent No.: US 11,098,699 B2
(45) Date of Patent: Aug. 24, 2021

(54) WIND TURBINE WITH RETRACTABLE LIGHT EMITTER

(71) Applicant: SIEMENS GAMESA RENEWABLE ENERGY A/S, Brande (DK)

(72) Inventors: Anders Vangsgaard Nielsen, Silkeborg (DK); Bodo Richert, Herning (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/334,795

(22) PCT Filed: Sep. 13, 2017

(86) PCT No.: PCT/EP2017/072948
§ 371 (c)(1),
(2) Date: Mar. 20, 2019

(87) PCT Pub. No.: WO2018/059935
PCT Pub. Date: Apr. 5, 2018

(65) Prior Publication Data
US 2019/0234380 A1 Aug. 1, 2019

(30) Foreign Application Priority Data

Sep. 27, 2016 (DE) .................... 10 2016 218 594.2

(51) Int. Cl.
*F03D 80/10* (2016.01)
*F03D 80/30* (2016.01)
*G08B 5/38* (2006.01)

(52) U.S. Cl.
CPC ............. *F03D 80/10* (2016.05); *F03D 80/30* (2016.05); *G08B 5/38* (2013.01); *Y02E 10/72* (2013.01)

(58) Field of Classification Search
CPC ................................. F03D 80/10; F03D 80/30
See application file for complete search history.

(56) References Cited

U.S. PATENT DOCUMENTS 3,235,805 A * 2/1966 Hings .................... H01Q 1/362
455/274
5,035,094 A * 7/1991 Legare ................ F16H 25/2056
52/118

(Continued)

FOREIGN PATENT DOCUMENTS

CN 102105685 A 6/2011
CN 109469581 A * 3/2019 ............. F03D 80/10

(Continued)

OTHER PUBLICATIONS

Lynch, A. Beam Manipulation: Prisms vs Mirrors. Photonic. Mar. 2009. accessed from https://www.edmundoptics.com/globalassets/knowledge-center/articles/beam-manipulation-prisms-vs-mirrors-en.pdf (Year: 2009).*

(Continued)

*Primary Examiner* — Igor Kershteyn
*Assistant Examiner* — Topaz L. Elliott
(74) *Attorney, Agent, or Firm* — Schmeiser, Olsen & Watts LLP

(57) ABSTRACT

Provided is a wind turbine having at least one lighting device, which has a light source and emission device, wherein the light source and the emission device are arranged at different positions of the wind turbine, wherein at least one positioning device is provided which, by a positioning section, is coupled to the emission device in such a way that the emission device can be moved between a first position and a second position by a movement of the positioning section.

16 Claims, 2 Drawing Sheets

(56) References Cited

U.S. PATENT DOCUMENTS

| | | | | |
|---|---|---|---|---|
| 5,986,792 | A * | 11/1999 | Rizkin | B64F 1/20 |
| | | | | 359/212.1 |
| 6,762,695 | B1 * | 7/2004 | Eslambolchi | G02B 6/0008 |
| | | | | 340/953 |
| 7,905,701 | B2 * | 3/2011 | Matsushita | F03D 80/40 |
| | | | | 415/4.3 |
| 8,154,139 | B2 * | 4/2012 | Egedal | F03D 80/10 |
| | | | | 290/44 |
| 8,359,917 | B2 * | 1/2013 | Lind | F03D 17/00 |
| | | | | 73/170.01 |
| 8,636,468 | B2 * | 1/2014 | Munk-Hansen | F03D 80/50 |
| | | | | 416/61 |
| 8,816,863 | B2 * | 8/2014 | Arman | A01M 29/10 |
| | | | | 340/573.2 |
| 9,239,143 | B2 * | 1/2016 | Wurster | F21V 5/046 |
| 9,414,581 | B1 * | 8/2016 | Riesland | A01M 29/08 |
| 10,132,298 | B2 * | 11/2018 | Schultz | F21V 5/046 |
| 2002/0093823 | A1 * | 7/2002 | Rohlfing | F03D 80/10 |
| | | | | 362/328 |
| 2007/0222227 | A1 * | 9/2007 | Casazza | H02K 7/088 |
| | | | | 290/55 |
| 2009/0139739 | A1 | 6/2009 | Hansen | |
| 2010/0194603 | A1 * | 8/2010 | Wobben | F03D 80/10 |
| | | | | 340/983 |
| 2011/0123320 | A1 * | 5/2011 | Lind | F03D 80/50 |
| | | | | 415/182.1 |
| 2011/0194283 | A1 | 8/2011 | Roer | |
| 2011/0229320 | A1 | 9/2011 | Hancock et al. | |
| 2013/0223092 | A1 * | 8/2013 | Wurster | F21S 8/08 |
| | | | | 362/553 |
| 2013/0336786 | A1 | 12/2013 | Kissinger | |
| 2014/0339380 | A1 * | 11/2014 | Barrett | F16M 13/02 |
| | | | | 248/125.8 |
| 2014/0377060 | A1 | 12/2014 | Quell | |
| 2016/0044910 | A1 * | 2/2016 | Lang | A01M 29/08 |
| | | | | 119/713 |
| 2016/0055399 | A1 * | 2/2016 | Hiester | A01M 29/16 |
| | | | | 382/110 |
| 2017/0284377 | A1 * | 10/2017 | Schultz | F03D 80/10 |
| 2020/0191123 | A1 * | 6/2020 | Harms | F03D 80/10 |

FOREIGN PATENT DOCUMENTS

| | | | | |
|---|---|---|---|---|
| DE | 676166 | C | 5/1939 | |
| DE | 10146379 | A1 * | 4/2003 | F03D 80/10 |
| DE | 10146379 | A1 | 4/2003 | |
| DE | 10348994 | A1 | 5/2005 | |
| DE | 202014006066 | U1 * | 10/2014 | F03D 80/10 |
| EP | 91997 | A1 * | 10/1983 | F03D 80/80 |
| EP | 1461530 | A1 | 9/2004 | |
| EP | 2325484 | A1 | 5/2011 | |
| EP | 2431608 | A2 | 3/2012 | |
| EP | 2698535 | A1 | 2/2014 | |
| EP | 2431608 | B1 * | 11/2016 | F03D 80/80 |
| JP | 2002279802 | A * | 9/2002 | F03D 13/10 |
| KR | 20110029863 | A * | 3/2011 | |
| KR | 20140005953 | U * | 11/2014 | F03D 80/10 |
| WO | WO 0159517 | A1 | 8/2001 | |
| WO | WO 2007068254 | A1 | 6/2007 | |
| WO | WO2007068254 | A1 | 6/2007 | |
| WO | WO 2016046045 | A1 | 3/2016 | |
| WO | WO-2018130333 | A1 * | 7/2018 | F03D 80/10 |

OTHER PUBLICATIONS

FAA (Advisory Circular 70/7460-IL). (Year: 2015).*
English translation of First Office Action in corresponding CN 201780059841 (Year: 2020).*
*PCT International Search Report of International Searching Authority* mailed corresponding to PCT International Application No. PCT/EP2017/072948.
Bundesministerium für Verkehr und digitale Infrastruktur Bundesanzeiger / Bekanntmachung; Jan. 9, 2015; pp. 1-19: Herausgegeben vom Bundesministerium der Justiz und für Verbraucherschutz,; 2015.
Bundesministerium für Verkehr und digitate Infrastruktur: Bundesanzeiger / Bekanntmachung; Jan. 9, 2015; pp. 1-19; Herausgegeben vom Bundesministerium der Justiz und für Verbraucherschutz,; 2015.

* cited by examiner

WIND TURBINE WITH RETRACTABLE LIGHT EMITTER

CROSS-REFERENCE TO RELATED APPLICATIONS

This application claims priority to PCT Application No. PCT/EP2017/072948, having a filing date of Sep. 13, 2017, which is based on German Application No. 10 2016 218 594.2, having a filing date of Sep. 27, 2016, the entire contents both of which are hereby incorporated by reference.

FIELD OF TECHNOLOGY

The following relates to a wind turbine with at least one lighting device, which has a light source and an emitting device, wherein the light source and the emitting device are arranged at different positions of the wind turbine.

BACKGROUND

Such wind turbines are known from the known art. It is also known that, to create wind turbines that generate sufficient energy even at low wind speeds, the diameters of the rotors, that is to say the length of the rotor blades, is continually increasing. Accordingly, the heights of the towers must likewise increase, so that the larger rotors can be attached to nacelles arranged at a higher level. As the height of the wind turbines increases, they become obstacles for air traffic, so that it is necessary to provide the wind turbines with corresponding indicators and lighting devices to avoid collisions with flying objects.

This leads to various minimum requirements for the identification and lighting of wind turbines in various daytime and lighting conditions and for various parameters of the wind turbine, such as for example the maximum height. These requirements are specified for example in the German publication "Nachrichten für Luftfahrer" [Air Transport Bulletin] and the Federal Gazette "BAnz AT 01.09.2015 B4".

Among the provisions are a maximum distance between the rotor blade tips or the highest point of the wind turbine and the position of the lighting of the wind turbine. Thus, a wind turbine is known from US 2014 0 377 060, which discloses the lighting of the wind turbine by means of floodlighting.

At the same time, it should be ensured on the one hand that the corresponding light source can be repaired and/or maintained as easily as possible, therefore is easily accessible, and it should be ensured on the other hand that a corresponding lighting device does not come into conflict with other devices or functions with respect to the wind turbine, such as for example the landing of a helicopter on a platform of the wind turbine.

SUMMARY

To achieve this aspect, in the case of a wind turbine of the type mentioned at the beginning it is provided according to embodiments of the invention that at least one positioning device, which is coupled to the emitting device by means of a positioning section in such a way that the emitting device can be moved between a first position and a second position by a movement of the positioning section, is provided.

According to embodiments of the invention, it can consequently be advantageously achieved that the emitting device, which emits the light used for the lighting or identification of the wind turbine in the corresponding direction, can be moved between a first position and a second position. As a result, it can be achieved in particular that the minimum requirement for the distance between the highest point of the wind turbine and the emitting device can be met. In particular, it is in this case possible to keep the distance between the emitting device and the highest point of the wind turbine or the rotor blade tips below 65 m.

Furthermore, it is advantageously achieved that maintenance of the emitting device or a repair of the same can be readily carried out. For this purpose, the emitting device can be moved into the corresponding position, so that it can be easily reached by maintenance staff. The two positions in fact define on the one hand the maintenance position and on the other hand the position in which the emitting device is used for the lighting or identification of the wind turbine. Similarly, the emitting device may be retracted, if for example a helicopter is to land on a platform of the wind turbine, so that the helicopter can continue to be given clearance to use the air space and a collision between the emitting device and the helicopter is avoided.

In the case of the wind turbine according to embodiments of the invention, it is provided with particular preference that the movable emitting device is connected to the light source by means of an optical waveguide. The emitting device, which is located at a different position on the wind turbine than the light source, can therefore be connected or coupled to the latter by means of an optical waveguide. One advantage of this is that, even when there are variations of the positioning device on which the emitting device is arranged, the entire light of the light source is always directed into the emitting device, because, when variations occur, the optical waveguide can be moved along with the positioning device. This refinement is also advantageous because, by contrast with a power supply to a light source that is usually arranged in the region in which the emitting device is arranged, in the case of the wind turbine according to embodiments of the invention the probability of a lightning strike is reduced because a power supply to the emitting device through electrical lines is not necessary. The optical waveguide is in this case formed for example as a glass fiber.

It is alternatively conceivable that the light source and the emitting device are arranged together on the positioning section. The light source and the emitting device are in this case not arranged at different positions.

According to a development of the wind turbine according to embodiments of the invention, it may be provided that the positioning section is formed as a mast that is movable, for example telescopic, in relation to a nacelle of the wind turbine or rigid. Therefore, the emitting device is arranged on the mast, for example at the tip of the mast, wherein the light source can be arranged at the bottom of the mast, for example in the region of its foot. In this case, the optical waveguide may for example run inside the mast. By suitably choosing the length of the mast, the minimum requirement for the distance between the emitting device and the highest point of the wind turbine can therefore be met. The mast can be moved in relation to the nacelle, so that the emitting device arranged on it can be moved between the first position and the second position.

According to a development of the previously described refinement, it is provided with particular preference that the mast is at least partially retractable into the nacelle. In this case, the first position of the emitting device may represent the extended position and the second position may represent the retracted position, or vice versa. Therefore, the mast can be at least partially retracted into the nacelle for maintenance work or repair work, or if it is in the way for some other task, so that on the one hand the emitting device comes closer to the nacelle and on the other hand the mast can be lowered or retracted into the nacelle.

Alternatively, it may similarly be provided that the mast can be moved outside the wind turbine. As a result, the mast is not retracted into the nacelle, but is moved outside the nacelle. The moving of the mast in this case takes place approximately parallel to the direction of the height of the wind turbine. For moving the mast outside the nacelle, the wind turbine has a corresponding mount or positioning device, which allows the movement outside the nacelle.

According to a further refinement of the wind turbine according to embodiments of the invention, the mast may be assigned at least one fastening means or fastener, in particular a cable, which fastens the mast to the nacelle and/or reduces any swaying of the mast perpendicularly to its direction of movement. The fastening means or fastener therefore has the effect that the mast cannot oscillate as much, because it is to a certain extent braced to the nacelle. It goes without saying that the fastening means or fastener is formed in such a way that it does not impair the mobility of the mast in its direction of movement. The direction of movement is that direction in which the mast can be moved to move the emitting device between the first position and the second position.

With particular preference, the positioning device may be assigned a number of emitting devices and/or a number of light sources. This offers the advantage that indicators or signals in various colors or at various wavelengths can be output at the emitting device or the number of emitting devices. In addition, the individual emitting devices may be arranged at different positions of the positioning section.

A particularly preferred refinement of the wind turbine according to embodiments of the invention provides that a number of positioning sections with in each case at least one emitting device are arranged on the wind turbine in such a way that, irrespective of the position of a rotor of the wind turbine, at least one emitting device is visible from any direction at the height of the at least one emitting device. This ensures that a flying object approaching the wind turbine cannot be in a dead spot, but instead at least one emitting device is always visible from any direction. Otherwise, for example if the rotor is stationary, the at least one emitting device could be hidden behind the rotor, so that an approaching flying object cannot register the emitting device or the light sent out by the emitting device. Because of this refinement, it is provided that, irrespective of the position of the rotor, the visibility of the at least one emitting device from any direction is ensured.

In particular, in the case of the wind turbine according to embodiments of the invention it is provided that, with a deviation from the horizontal of ±5°, the lighting device assigned to it, in particular the emitting device, reaches or exceeds an effective operating light intensity of 100 cd.

Furthermore, in the case of the wind turbine according to embodiments of the invention it is provided with preference that the emitting device comprises at least one optical unit, in particular a prism and/or a lens. As a result, the emitted light can be correspondingly modified, so that the light distribution produced improves the visibility of the wind turbine or of the signal generated by the lighting device.

Furthermore, in the case of the wind turbine according to embodiments of the invention it may be provided that the positioning device is assigned at least one lightning arrester. The lightning arrester may in this case have at least one lightning receptor and/or at least one lightning receptor section. When there is a lightning strike, it is therefore arrested by the lightning arrester, so that damage to the wind turbine can be prevented.

With particular preference, the lightning arrester in this case projects in the vertical direction above the positioning section and the emitting device arranged on the positioning section. The lightning arrester, in particular the lightning receptor section of the lightning arrester, therefore forms the highest point of the positioning device.

According to a further form of the wind turbine according to embodiments of the invention, the light source may be operated in a continuous or pulsed manner. This allows the requirements for safeguarding air traffic to be met, so that all of the light patterns or lighting patterns specified for this can be displayed.

Furthermore, it may be provided with preference that the light source can be synchronized with at least one light source assigned to another wind turbine. As a result, a number of light sources that are assigned to individual wind turbines in a wind farm can be synchronized with one another, so that they simultaneously perform the corresponding lighting patterns with the same frequency.

According to a further refinement of the wind turbine according to embodiments of the invention, at least one emergency power supply by means of which the light source can be operated may be provided. As a result, the light source can also be operated when there is a failure of the power supply system or when the rotor is stationary, so that safety for air traffic remains ensured even when the light source cannot be supplied by the usual power supply.

With particular preference, a sensing device, which is designed to sense the time of day and/or to sense whether it is day or night and/or to sense a light intensity of the ambient light, is provided, wherein the light intensity of the light source can be controlled in dependence on the ambient light intensity by means of a control device. It is therefore possible according to this refinement of embodiments of the invention to sense the time of day or to sense whether it is day or night. In dependence on the time of day, there are changing requirements for the lighting of the wind turbine. In particular, this may involve the sensing of a light intensity of the ambient light, so that the light intensity of the light source can be controlled in dependence on the ambient light. This ensures that, at any time of day and night and irrespective of the weather, the wind turbine can be correspondingly illuminated. The light intensity may for example be determined by means of a photosensor.

In a further advantageous refinement of embodiments of the invention, it may be provided that the light source is controllable in at least three modes, wherein the light intensity
  in a daylight mode is ≤100 000 cd and ≥50 000 cd
  in a twilight mode is ≤20 000 cd and ≥10 000 cd
  in a night mode is ≤2000 cd and ≥1000 cd.

This ensures that the light intensity of the light that is generated by the light source is controlled in dependence on the intensity of the ambient light. In this respect, it is required to control the light of the light source more intensively in the daytime, in dependence on the weather, so that it remains visible against the prevailing ambient light. In the night mode, this is not required, because the ambient light is then much less intensive. In particular, the light source of the wind turbine according to embodiments of the invention may be designed to emit red light and/or white light and/or infrared light. In particular, the light source may in this case be operated in a pulsed manner, in particular with 40 pulses per minute.

According to a development of the wind turbine according to embodiments of the invention, it may be provided that it has a sensing device which is designed to sense objects, in particular flying objects, in the vicinity of the wind turbine, wherein the light source can be controlled in dependence on the result of the sensing. In this refinement it is provided that the wind turbine has a sensing device, so that a sensing of objects in the vicinity of the wind turbine is possible. This makes it possible to ensure that objects approaching the wind turbine or objects in the vicinity of the wind turbine, in particular flying objects such as aircraft or helicopters, can be sensed, so that the lighting device, in particular the light source, can be controlled correspondingly. As a result, it is possible that the light source can be activated primarily when a flying object is in the vicinity of the wind turbine.

In other words, the vicinity of the wind turbine may be defined by a distance within which a flying object is classified as relevant to safety. If a flying object comes within this distance from the wind turbine, the light source can be activated correspondingly, so that the wind turbine is illuminated or identified. A radar device which is designed to sense the position or the distance of the object from the wind turbine and its direction of movement and speed may be used with preference as the sensing device. In dependence on the result of the sensing, the light source can be activated correspondingly by means of a control device. Consequently, the visibility of the wind turbine for the air traffic can be improved and it is also achieved that the light source is primarily brought into operation when an object is at a defined distance from the wind turbine.

According to a further alternative of the wind turbine according to embodiments of the invention, it may be provided that the emitting device is integrated in a rotor blade of the wind turbine. As a result, the minimum requirement for the distance between the rotor blade tip and the position of the emitting device is achieved particularly easily, because the emitting device can in fact be integrated at any desired location of the rotor blade.

It may be provided here with preference that the at least one emitting device is arranged on the upwind side and/or the downwind side of the rotor blade. It is therefore possible to arrange an emitting device both on the upwind side and on the downwind side, so that the visibility of the wind turbine or the signal that is generated by the lighting device is further improved.

The optical waveguide that conducts the light of the light source to the emitting device, which according to this refinement of embodiments of the invention is located in the rotor blade or on the rotor blade, may with particular preference run along the blade outer side or in a groove or a channel in the rotor blade. Advantageously, the laying of the optical waveguide does not in this case increase the risk of a lightning strike because, as previously described, the optical waveguide consists for example of glass fiber. The optical waveguide may in this case advantageously run under a vortex generator within the rotor blade.

If the emitting device protrudes out of the rotor blade, it may be provided with preference that it is aerodynamically shaped. This avoids the emitting device adversely influencing the aerodynamics of the rotor blades or the rotor blade to which it is assigned.

According to a further refinement of the wind turbine according to embodiments of the invention, it may be provided that the emitting device is formed as a vortex generator. This ensures that the emitting device itself acts as a vortex generator, so that it assumes the function of the vortex generator. Therefore, the functionality of the emitting device can already be integrated in the vortex generator and it is possible to dispense with a separate vortex generator.

The light source that is assigned to the emitting device or is connected to it is arranged with preference in the region of a connection of the rotor blade. It is consequently ensured that the emitting device and the light source are arranged at different positions of the wind turbine, but the light of the light source can be conducted to the emitting device, for example by way of an optical waveguide.

BRIEF DESCRIPTION

Some of the embodiments will be described in detail, with reference to the following figures, wherein like designations denote like members, wherein.

DETAILED DESCRIPTION

Figure 1:
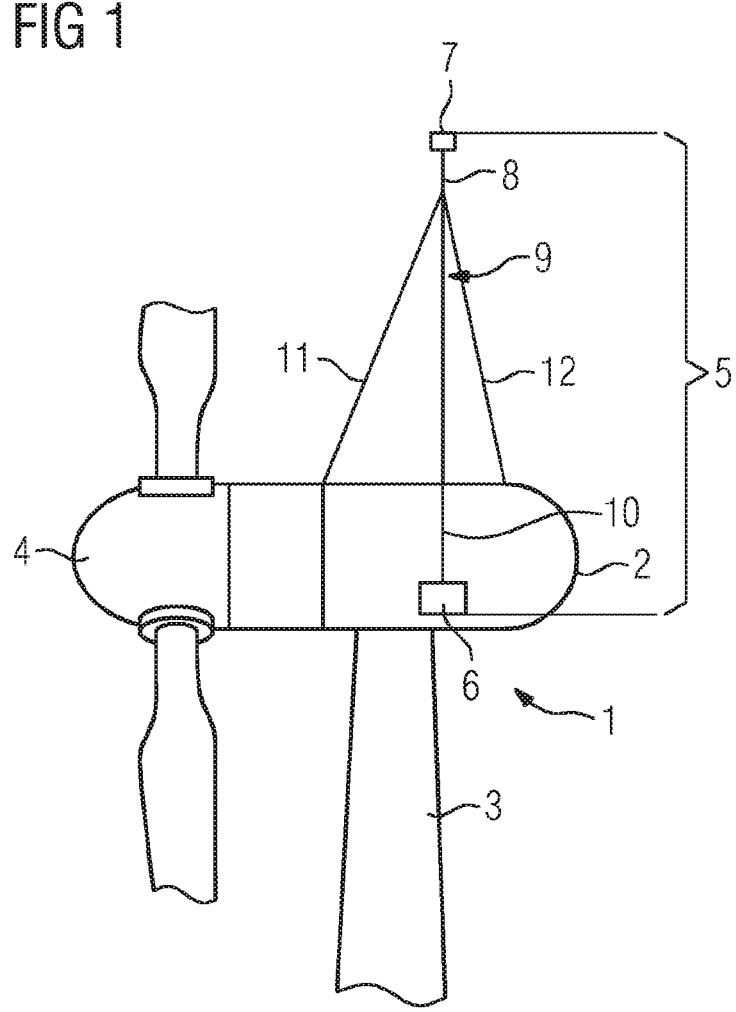
FIG. 1 shows a wind turbine according to embodiments of the invention according to a first exemplary embodiment.

FIG. 1 shows a detail of a wind turbine 1 according to a first exemplary embodiment. As can be seen, the wind turbine 1 has a nacelle 2, which is arranged on a tower 3. Rotatably fastened on the nacelle 2 is a rotor 4. The wind turbine 1 also has a lighting device 5, which comprises a light source 6 and an emitting device 7.

As can be seen, the emitting device 7 is arranged on a positioning section 8 of a positioning device 9. According to this exemplary embodiment, the positioning device 9 comprises a mast, which can be moved between two positions and forms the positioning section 8, wherein the emitting device 7 is arranged at the top of the mast. Shown here in FIG. 1 is a first position, in which the positioning device 9 is extended, and therefore the emitting device 7 is at its highest point.

According to this exemplary embodiment, the distance between the rotor blade tip and the emitting device 7 in this position is less than 65 m. For moving the positioning section 8 and the emitting device 7 arranged on it, the positioning device 9 has an actuator (not shown), which is designed to move the positioning section 8 in the vertical direction of the wind turbine.

The light source 6 is connected to the emitting device 7 by means of an optical waveguide 10. The light emitted by the light source 6 can therefore be conducted by means of the optical waveguide 10 to the emitting device 7 and is emitted there to illuminate or identify the wind turbine 1. According to this exemplary embodiment, the light source 6 is formed as a light-emitting diode (LED), but it goes without saying that it may also be formed as any other desired lighting means or a light or a light source, for example as a laser, which is designed to couple light correspondingly by way of the optical waveguide 10 into the emitting device 7.

Also shown in FIG. 1 is that the positioning device 9 is arranged on the nacelle 2 by means of two fastening elements 11, 12. The fastening elements 11, 12 are formed as cables and brace the mast to the nacelle 2. This ensures that swaying of the positioning section 8 is reduced. It goes without saying that the fastening elements 11, 12 allow the positioning device 9 or the positioning section 8 to be movable in relation to the nacelle 2.

Figure 2:
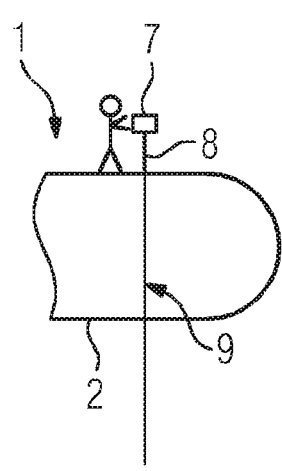
FIG. 2 shows a detail of the wind turbine according to embodiments of the invention from FIG. 1.

FIG. 2 shows a detail of the wind turbine 1 from FIG. 1, wherein the positioning section 8 has been retracted into the nacelle 2. In this position, the emitting device 7 is closer to the nacelle 2, so that an employee can perform maintenance work on the emitting device 7 and can for example repair it. Furthermore, in this position it is ensured that the positioning device 9 or the positioning section 8 and the emitting device 7 are not in the way of other tasks that are performed on the wind turbine. For example, a helicopter can land on a platform (not shown), which is provided on the nacelle 2, without the risk of colliding with the positioning device 9.

Figure 3:
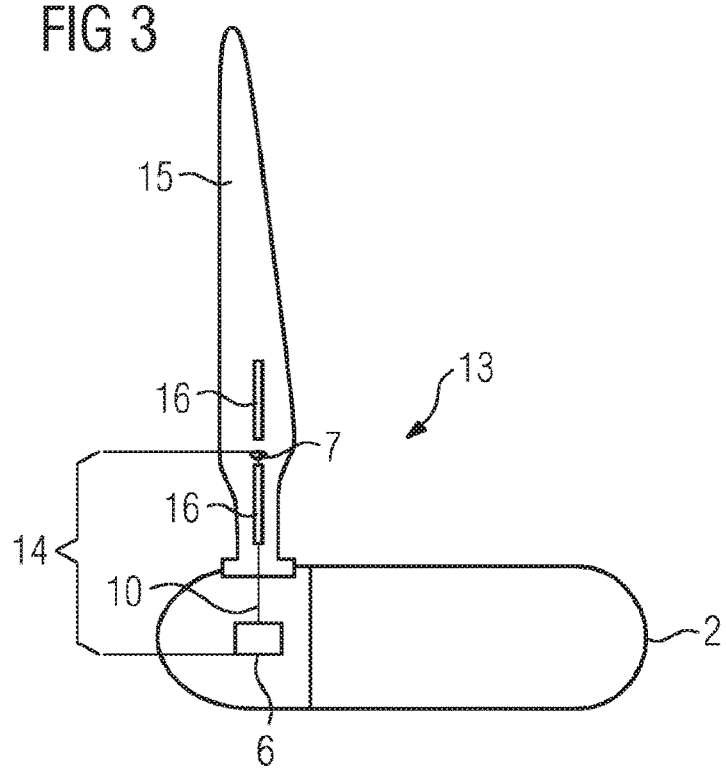
FIG. 3 shows a wind turbine according to a second exemplary embodiment.

FIG. 3 shows a detail of a wind turbine 13 according to a second exemplary embodiment. The wind turbine 13 has a lighting device 14, which in turn comprises a light source 6 and an emitting device 7. The emitting device 7 is coupled to the light source 6 by means of an optical waveguide 10. According to the second exemplary embodiment, the emitting device 7 is arranged on a rotor blade 15 of the wind turbine 13. In this exemplary embodiment, the optical waveguide 10 runs within the rotor blade 15 and connects the light source 6 to the emitting device 7. The emitting device 7 faces the upwind side of the rotor blade 15, while it goes without saying that it is similarly possible to arrange the emitting device 7 in the direction of the downwind side. It is also shown in FIG. 3 that two vortex generators 16 are arranged on the rotor blade 15 alongside the emitting device 7.

Figure 4:
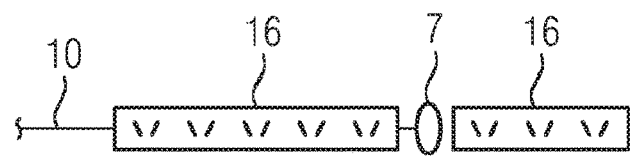
FIG. 4 shows a detail of the wind turbine from FIG. 3.

FIG. 4 shows a detail of the wind turbine 13 from FIG. 3, the rotor blade 15 not being depicted for the sake of overall clarity. As can be seen, the optical waveguide 10 runs under the vortex generator 16. In this exemplary embodiment, the emitting device 7 is aerodynamically shaped, in order not to adversely influence the aerodynamics of the rotor blade 15.

Figure 5:
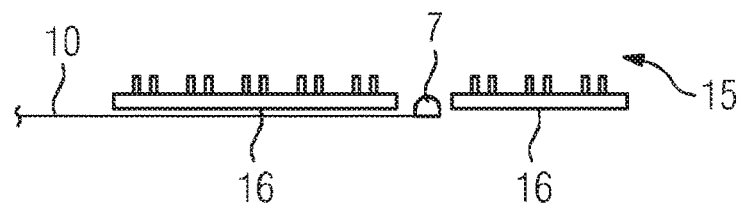
FIG. 5 shows a detail of the wind turbine from FIG. 3.

FIG. 5 shows a further detail of the wind turbine 13 from FIG. 3 in a view turned by about 90°. In this case it can be seen that the optical waveguide 10 runs under the vortex generator 16. It can also be seen that the light source 7 is arranged between the two vortex generators 16 and has a substantially hemispherical cross section.

Figure 6:
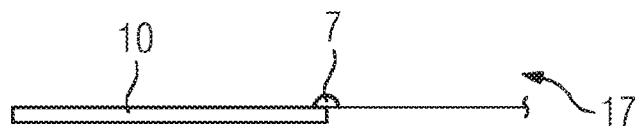
FIG. 6 shows a detail of a wind turbine according to a fourth exemplary embodiment.

FIG. 6 shows a further exemplary embodiment, in which the light source 7 is arranged on the blade outer side of a rotor blade 17. The optical waveguide 10 runs under the surface of the rotor blade 17, for example in a groove or in a channel in the rotor blade 17.

It goes without saying that the individual exemplary embodiments can be combined with one another in any way desired, as long as it is technically feasible.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A wind turbine with at least one lighting device, which has a light source and an emitter, wherein the light source and the emitter are arranged at different positions of the wind turbine,
wherein at least one positioning device, which is coupled to the emitter by a positioning section in such a way that the emitter can be moved vertically between a first position and a second position by a movement of the positioning section, is provided, wherein the light source is arranged at a bottom of the positioning section, wherein in the first position the positioning section extends from a top of a nacelle of the wind turbine, and wherein in the second position, the positioning device is at least partially retracted into the nacelle of the wind turbine such that the light source extends out of the nacelle opposite from the top.

2. The wind turbine as claimed in claim 1, wherein the positioning section is formed as a mast that is movable in relation to the nacelle of the wind turbine.

3. The wind turbine as claimed in claim 2, wherein the mast is assigned at least one fastener which includes cable, which fastens the mast to the nacelle and/or reduces any swaying of the mast perpendicularly to its direction of movement.

4. The wind turbine as claimed in claim 1, wherein the positioning device is assigned a number of emitter and/or a number of light sources.

5. The wind turbine as claimed in claim 1, wherein a number of positioning sections with in each case at least one emitter are arranged on the wind turbine in such a way that, irrespective of the position of a rotor of the wind turbine, at least one emitter is visible from any direction at the height of the at least one emitter.

6. The wind turbine as claimed in claim 1, wherein the emitter comprises at least one optical unit including at least one of a prism and a lens.

7. The wind turbine as claimed in claim 1, wherein the positioning device is assigned at least one lightning arrester.

8. The wind turbine as claimed in claim 7, wherein the lightning arrester projects in the vertical direction above the positioning section and the emitter.

9. The wind turbine as claimed in claim 1, wherein the light source can be operated in a continuous or pulsed manner.

10. The wind turbine as claimed in claim 1, wherein the light source can be synchronized with at least one light source assigned to another wind turbine.

11. The wind turbine as claimed in claim 1, wherein at least one emergency power supply by which the light source can be operated is provided.

12. The wind turbine as claimed in claim 1, wherein a sensor, configured, to sense the time of day and/or to sense whether it is day or night and/or to sense a light intensity of the ambient light, is provided, wherein the light intensity of the light source can be controlled in dependence on the ambient light intensity by a control device.

13. The wind turbine as claimed in claim 12, wherein the light source is controllable in at least three modes, wherein the light intensity
   in a daylight mode is ≤100 000 cd and ≥50 000 cd
   in a twilight mode is ≤20 000 cd and ≥10 000 cd
   in a night mode is ≤2000 cd and ≥1000 cd.

14. The wind turbine as claimed in claim 1, wherein the light source is designed to emit red light and/or white light and/or infrared light.

15. The wind turbine as claimed in claim 1, wherein the wind turbine has a sensor which is designed to sense objects, in particular flying objects, in the vicinity of the wind turbine, wherein the light source can be controlled in dependence on the result of the sensing.

16. A wind turbine with at least one lighting device, which has a light source and an emitter, wherein the light source and the emitter are arranged at different positions of the wind turbine, wherein at least one positioning device, which is coupled to the emitter by a positioning section in such a way that the emitter can be moved vertically between a first position and a second position by a movement of the positioning section, is provided,
wherein the positioning device is vertically movable in relation to a nacelle of the wind turbine, and wherein the positioning section is vertically movable in relation to the positioning device, wherein the light source is arranged at a bottom of the positioning section, wherein in the first position the positioning section extends from a top of the nacelle of the wind turbine, and wherein in the second position, the positioning device is at least partially retracted into the nacelle of the wind turbine such that the light source extends out of the nacelle opposite from the top.

* * * * *